(12) United States Patent
Alam et al.

(10) Patent No.: US 12,145,865 B1
(45) Date of Patent: Nov. 19, 2024

(54) HYDROGEL NANOBEADS FOR ADSORPTION OF POLLUTANTS FROM WASTEWATER

(71) Applicant: KING SAUD UNIVERSITY, Riyadh (SA)

(72) Inventors: Javed Alam, Riyadh (SA); Mansour Salah Alhoshan, Riyadh (SA); Fekri Abdulraqeb Ahmed Ali, Riyadh (SA); Arun Kumar Shukla, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/233,089

(22) Filed: Aug. 11, 2023

(51) Int. Cl.
| | |
|---|---|
| *C02F 1/28* | (2023.01) |
| *B01J 20/02* | (2006.01) |
| *B01J 20/24* | (2006.01) |
| *B01J 20/28* | (2006.01) |
| *B01J 20/30* | (2006.01) |
| *C02F 101/30* | (2006.01) |
| *C08J 3/075* | (2006.01) |
| *C08J 3/24* | (2006.01) |

(52) U.S. Cl.
CPC ........... *C02F 1/286* (2013.01); *B01J 20/0244* (2013.01); *B01J 20/24* (2013.01); *B01J 20/28007* (2013.01); *B01J 20/28019* (2013.01); *B01J 20/28047* (2013.01); *B01J 20/30* (2013.01); *C08J 3/075* (2013.01); *C08J 3/24* (2013.01); *C02F 2101/308* (2013.01); *C08J 2305/00* (2013.01)

(58) Field of Classification Search
CPC . C02F 1/286; C02F 2101/308; B01J 20/0244; B01J 20/24; B01J 20/28007; B01J 20/28019; B01J 20/28047; B01J 20/30; C08J 3/075; C08J 3/24

USPC ...................................................... 536/123.1
See application file for complete search history.

(56) References Cited

FOREIGN PATENT DOCUMENTS

CN 108579628 A 9/2018

OTHER PUBLICATIONS

Jones et al. Iron oxyhydroxide colloids stabilized with polysaccharides. Colloid Polym Sci 278:491-501, 2000. (Year: 2000).*
Vijayakumar et al. Biopolymer K-carrageenan wrapped ZnO nanoparticles as drug delivery vehicles for anti MRSA therapy. International Journal of Biological Macromolecules 144 (2020) 9-18. Available online Dec. 7, 2019. (Year: 2020).*
Kulal et al., "Hybrid nanocomposite of kappa-carrageenan and magnetite as adsorbent material for water purification," Dec. 2020;International Journal of Biological Macromolecules 165(Pt A):542-553.
Malatji et al., Removal of methylene blue from wastewater using hydrogel nanocomposites, Nanomaterials and Nanotechnology vol. 11: 1-27; 2021.
Azizi et al., "Hydrogel beads bio-nanocomposite based on Kappa-Carrageenan and green synthesized silver nanoparticles for biomedical applications," International Journal of Biological Macromolecules, vol. 104, Part A, Nov. 2017, pp. 423-431.

\* cited by examiner

*Primary Examiner* — Yih-Horng Shiao
(74) *Attorney, Agent, or Firm* — Nath, Goldberg & Meyer; Joshua B. Goldberg

(57) ABSTRACT

Hydrogel nanobeads include an ionically crosslinked sulfated polysaccharide biopolymer such as a carrageenan. In an embodiment, the hydrogel nanobeads comprise kappa carrageenan (κCg) and a metal ion crosslinking agent. In an embodiment, the metal ion crosslinking agent includes a metal ion selected from the group consisting of $Zn^{2+}$, $Fe^{2+}$, $Fe^{3+}$, and $Ti^{3+}$. The hydrogel nanobeads can be used for removal of pollutants in wastewater.

7 Claims, 4 Drawing Sheets

HYDROGEL NANOBEADS FOR ADSORPTION OF POLLUTANTS FROM WASTEWATER

BACKGROUND

1. Field

The present disclosure provides hydrogel nanobeads for use in wastewater treatment. More specifically, the hydrogel nanobeads are prepared by ionically crosslinking a sulfated polysaccharide biopolymer with metal ions to form the hydrogel nanobeads.

2. Description of the Related Art

Wastewater generated from large-scale industries such as textiles, petrochemicals, oil refineries, and chemical manufacturing plants poses serious problems for human health and the environment. The wastewater which carries various pollutants, such as dyes and pigments, micro-plastic, ink, oils, metals, heavy metals, soaps and paper, has high toxicity levels. Traditional methods used for the treatment of wastewaters depend mainly on chemical (such as oxidation, advanced oxidation processes, and Fenton's reagent, etc.), physical (e.g., ion exchange, adsorption, and membrane filtration, etc.), or biological processes, or a combination thereof. Wastewater is typically treated to improve the quality of the effluent parameters, such as biochemical oxygen demand (BOD), chemical oxygen demand (COD), turbidity, and total suspension solids (TSS).

Unfortunately, conventional methods are insufficient to reliably remove textile dyestuffs in the range of 1-100 mg/L from wastewater. This is generally due to the fact that dyes have a complex nature stemming from their ionic characteristics, sensitivity to temperature, and pH. Also, most of the textile dyes are non-biodegradable and exhibit high solubility in water, making it difficult to remove them by conventional treatment methods.

Adsorption is one of the best treatment methods to treat textile dyestuffs-contaminated wastewater. Adsorption technology has played a dominant role in water and wastewater treatment for many years, owing generally to operation simplicity, high efficiency, and applicability on a large scale. Cost-effectiveness is recognized as the main criterion in the choice of an adsorption technology. The development of low-cost adsorbent materials has led to the fast growth of research interests in the adsorption technology.

Activated carbon (AC), natural and synthetic zeolites, clays, silica beads, nanomaterials, polymeric materials (organic polymeric resins, macro and micro porous hypercrosslinked polymers), and low-cost adsorbent materials (agriculture wastes, industrial by-products, biomass) are examples of adsorbent materials available in the market. Since adsorption technology was introduced, activated carbon (AC) in the form of granular activated carbon (GAC) or powdered activated carbon (PAC) has been the primary choice for the treatment or recycling of wastewaters because of its excellent adsorption capacity as a result of active free valencies and its morphology with high surface area. Even though AC-based adsorption technology is preferably used for treatment of wastewater, it is not cost-effective on a large scale because of its longtime consumption and difficulties in regeneration and reuse.

Alternatively, utility of biopolymers as adsorbent materials has exponentially increased over the years. As biopolymers are natural polymers essentially derived from living organisms, they are categorized as renewable and green adsorbent materials. They can include polynucleotides, polypeptides, or polysaccharides.

Utilization of biopolymers for use as adsorbents offers several advantages compared to conventional adsorbent materials. For example, biodegradability, biocompatibility, reproducibility, and low toxicity properties of biopolymers boost their application in adsorption for water and wastewater treatment. Biopolymers are essentially multifunctional macro-molecules made up of repeating chemical units produced from renewable resources which could be degraded in the environment. Biopolymers have demonstrated outstanding removal capabilities, and a great ability for regeneration and reuse in multiple adsorption-desorption cycles. Moreover, little modification in their chemical structure can alter the original properties of biopolymers, making them better suited for adsorption of various water pollutant types.

Many biopolymers exhibit a strong complexing ability for multivalent ions. Often such ions form ionic bridges between the polymer chains. This leads to the formation of ionic cross-linked networks and super-molecular structures, thus promoting the modification of the behavior of solid and gel polymer 3D networks.

One of the best known polysaccharide biopolymers is chitosan (CS). CS has a high affinity for adsorbing dyes, due to several available reactive functional groups. As a result, a number of studies have recently been done for the adsorptive removal of dyes utilizing chitosan-based materials. Even though CS has proven to be an effective adsorbent with a high adsorption ability (about 90%) for dyes from wastewaters, one important consideration in using CS as an adsorbent material is its solubility in acidic solutions. Usually, CS loses its ability to adhere as a solid adsorbent with adsorbates at a lower pH because of its dissolution which can restrict its application in water treatment.

Other promising biopolymers include carrageenans. Like other polysaccharide biopolymers, carrageenans are also abundantly available and a green, inexpensive source of polysaccharide. The only difference is carrageenans are harvested from the sea. Carrageenan biopolymers are a family of linear, water soluble, sulfated, anionic polysaccharides. They are large and highly flexible molecules that form a variety of different gels at room temperature due to the assembly of helical structures. Carrageenans are classified into three main classes, depending on the position and number of the ester sulfate groups, termed kappa-, iota-, and lambda-carrageenan.

Kappa-carrageenan i.e., κ-carrageenan, is composed of alternating α-(1-3)-D-galactose-4-sulfate and β-(1-4)-3,6-anhydro-D-galactose. Carrageenans ι-, κ-, and λ-, are extensively used in food industries, pharmaceutical formulations and as viscosity-binding agents in cosmetics because of their tremendous physical functional properties, such as thickening stabilizing, and gelling abilities. Food applications for carrageenans include dessert mousses, canned foods, salad dressings, ice cream, bakery fillings, and pet foods. They are highly flexible, large molecules that form a variety of different gels at room temperature due to the assembly of helical structures.

Thus, new solutions for wastewater treatment solving the aforementioned problems are desired.

SUMMARY

The present subject matter relates to hydrogel nanobeads including an ionically crosslinked sulfated polysaccharide biopolymer for removal of pollutants in wastewater. In an embodiment, the hydrogel nanobeads include carrageenan as the sulfated polysaccharide biopolymer. In an embodiment, the hydrogel nanobeads can comprise kappa carrageenan (κCg) hydrogel nanobeads including kappa carrageenan (κCg) and a metal ion crosslinking agent (herein, κCg hydrogel nanobeads). In an embodiment, the metal ion crosslinking agent can include a metal ion selected from the group consisting of $Zn^{2+}$, $Fe^{2+}$, $Fe^{3+}$, $Ti^{3+}$, and combinations thereof. The crosslinked hydrogel nanobeads can be generally spherical and can have a size ranging from about 20 nm to about 100 nm.

According to an embodiment, a method of removing a pollutant from wastewater can include contacting the wastewater with the present hydrogel nanobeads, whereby the pollutant is adsorbed by the hydrogel nanobead.

According to an embodiment, a method for making the present hydrogel nanobeads can include dissolving a metal salt in water to form a metal salt solution and adding the metal salt solution to a solution including carrageenan to form the hydrogel nanobeads.

According to an embodiment, the present subject matter relates to hydrogel nanobeads made according to the methods described herein.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figures 1A, 1B, 1C, 1D:
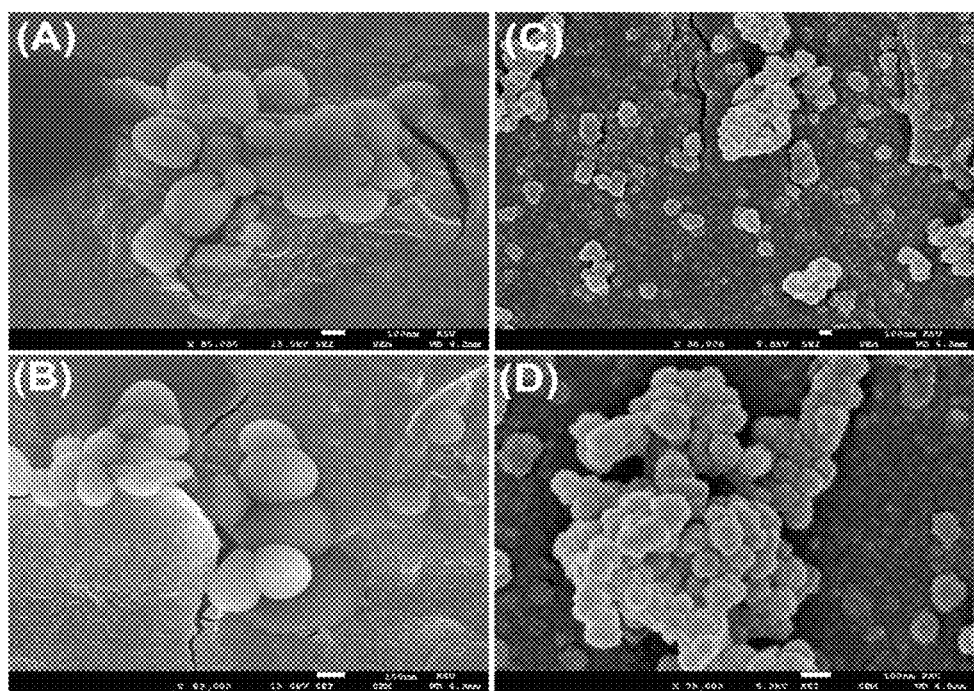
FIGS. 1A-1D show results of scanning electron microscopy (SEM) images for (A) Zn-cross-linked kCg hydrogel beads prior to adsorption studies; (B) Zn-cross-linked kCg hydrogel beads prior to adsorption studies; (C) Zn-cross-linked kCg hydrogel beads after adsorption studies; and (D) Zn-cross-linked kCg hydrogel beads after adsorption studies.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of."

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In an embodiment, the present subject matter relates to hydrogel nanobeads including an ionically crosslinked sulfated polysaccharide biopolymer for removal of pollutants in wastewater. In an embodiment, the hydrogel nanobeads are carrageenan hydrogel nanobeads including metal cross-linked carrageenan. In an embodiment, the carrageenan hydrogel nanobeads comprise kappa carrageenan (κCg), referred to herein as kappa carrageenan (κCg) hydrogel nanobeads. In an embodiment, the hydrogel nanobeads include a metal ion crosslinking agent. In an embodiment, the metal ion crosslinking agent includes a metal selected from zinc (Zn), titanium (Ti), and iron (Fe). In an embodiment, the metal ion crosslinking agent is selected from the group consisting of $Zn^{2+}$, $Fe^{2+}$, $Fe^{3+}$, $Ti^{3+}$, and combinations thereof. The hydrogel nanobeads can be generally spherical and can have a size ranging from about 20 nm to about 100 nm. The hydrogel nanobeads can have a high density of functional groups in a 3D network of hydrogel that can conjugate with wastewater pollutants, such as dyes, with unique selectivity and remarkable adsorption capacity.

In an embodiment, a method of forming the hydrogel nanobeads can include ionically crosslinking carrageenan with metal ions to form the hydrogel nanobeads. In an embodiment, the carrageenan is kappa carrageenan (κCg). In an embodiment, the metal ions are selected from the group consisting of $Zn^{2+}$, $Fe^{2+}$, $Fe^{3+}$, $Ti^{3+}$, and combinations thereof.

In an embodiment, the hydrogel nanobeads can be used to adsorb pollutants in wastewater for removing the pollutants therefrom. In an embodiment, an exemplary metal ion that can be used as an ionic cross linker for carrageenan can include zinc ions. In an embodiment, the zinc ions include $Zn^{2+}$ ions.

In one embodiment, the method for making the hydrogel nanobeads can include dissolving a metal salt in water to form a metal salt solution and adding the metal salt solution to a solution including carrageenan to immediately form the hydrogel nanobeads. The carrageenan can be κCg and the hydrogel nanobeads can include metal cross-linked κCg. Accordingly, in an embodiment, the present production methods can include cross-linking the carrageenan with the metal salt in the aqueous solution to form crosslinked hydrogel nanobeads. In an embodiment, the metal salt includes a metal selected from the group consisting of Fe, Zn, Ti, and combinations thereof. In an embodiment, the metal salt is zinc (II) chloride and the metal cross-linked κCg is zinc cross-linked κCg. In an embodiment, the metal ion formed is $Zn^{+2}$ ions. In an embodiment, a concentration of the $Zn^{+2}$ ions ranges from about 0.01 wt % to about 1.0 wt %, e.g., 0.01, 0.05, or 1.0 wt %. In an embodiment, a concentration of $Zn^{+2}$ ions is 0.05 wt %.

In an embodiment, a metal salt solution is added to a κCg solution dropwise at a temperature ranging from about 40° C. to about 50° C. for about 20 minutes to about 30 minutes. In an embodiment, the metal salt solution is added to the κCg solution dropwise at a temperature of about 45±2° C. for about 30 minutes. In an embodiment, the metal salt solution is stirred vigorously in the κCg solution using a magnetic stirrer at about 300 rpm to about 400 rpm. The resulting κCg hydrogel beads can be spherical in shape with a size ranging from about 20 nm to about 100 nm.

In an alternative embodiment, the present hydrogel nanobeads can be prepared at a temperature of about 55±1° C.

κ-carrageenan provides a suitable alternative to chitosan (CS) as an adsorbent because of its unique combination of biocompatibility, biodegradability, non-toxicity and anionic structure resulting from the presence of very reactive sulfate ($—OSO_3$) and hydroxyl ($—OH$) groups in its backbone. Accordingly, κCg is an effective adsorbent for removal of dyes, particularly cationic dyes. Hydrogel networks including a sulfate-containing polysaccharide, such as κCg, swell highly in ionic media. For hydrogel nanobeads formation, κCg, compared with other family members of carrageenans, such as lambda-λ and iota-I, is more suitable due to its appropriate viscoelastic properties, and the gelation rate is easy to control, with uniformity in structure. In an embodiment, the water absorbency or the nature of gelation can be about 2300 times.

According to an embodiment, a method of adsorbing pollutants from wastewater can include contacting the hydrogel beads with the wastewater. In an embodiment, the κCg hydrogel nanobeads can remove a variety of water pollutants such as dyes, metals, heavy metals, and other emerging contaminates from wastewaters. In an embodiment, the hydrogel nanobeads can adsorb pollutants from wastewater under neutral or near neutral pH conditions. In an embodiment, the κCg hydrogel nanobeads can adsorb significant amounts of cationic dyes, such as methylene blue (MB). In an embodiment, a concentration of the MB in the wastewater can be about 600 ppm.

As described herein, the hydrogel nanobeads can have a very high adsorption capacity (1050 mg/g$^{-1}$) for adsorbing methylene blue (MB). The nanobeads can have a high density of functional groups in a 3D network of hydrogel that can consistently conjugate with target dyes, leading to unique selectivity and remarkable adsorption capacity.

In an embodiment, the hydrogel nanobeads can remove a variety of water pollutants such as dyes, metals, heavy metals, and other emerging contaminates from wastewaters. In an embodiment, the dyes can include cationic dyes, such as methylene blue (MB). In an embodiment, the hydrogel nanobeads can exhibit a very high adsorption capacity. According to an embodiment, the hydrogel nanobeads can exhibit an adsorption capacity ranging from about 800 mg/g$^{-1}$ to about 1200 mg/g$^{-1}$, or from about 800 mg/g$^{-1}$ to about 1050 mg/g$^{-1}$. For example, the hydrogel nanobeads can exhibit an adsorption capacity of up to about 1050 mg/g$^{-1}$, particularly under near neutral conditions. In certain embodiments, the wastewater can be wastewater from pharmaceutical and/or industrial processes or areas.

The hydrogel nanobeads can provide an innovative adsorbent material for treating wastewater contaminated with dyes. κCg alone exhibits high hydro-solubility and is not stable in aqueous environments in hydrogel form. Thus, when κCg alone is contacted with water, it swells and then gradually dissolves or disintegrates into the water. As described herein, ionic crosslinking of κCg with a metal ion improves its solubility. In ionic cross-linking, negatively charged sulfate ($—OSO_3$) groups in the backbone κCg associate with positive charged multivalent ions and polymer molecules. Typically, ionic cross-linking is a non-covalent interaction. For developing hydrogels useful in water treatment applications, ionic cross-linking can be promising since the ionically cross-linked hydrogels are typically considered as biocompatible.

As described herein, metal ions provide innovative ionic cross-liking agents for κCg, with demonstrated success of high adsorption ability (near about 99%) for various types of water pollutants from wastewaters. For example, zinc ions ($ZnCl_2$ aqueous solution) can provide an effective ionic cross-linking agent to develop stable κCg hydrogel nano beads. Its cost effectiveness, better cross-linking ability, and small amount requirement (less than 1 wt. %) for use, renders zinc ions an excellent alternative to CS. Importantly, the Zn cross linked-κCg hydrogel in nanobead form provides a high surface area that is useful for adsorption. Further, using metal ions, particularly Zn ions as a cationic cross-linking agent for κCg, allows rapid formation of hydrogel networks at ambient temperature. The sizes of the hydrogel beads can be tuned by controlling the concentration of κCg.

An embodiment of the present teachings relates to an adsorption cartridge filter comprising hydrogel nanobeads as described herein for cationic dye removal.

It is believed that the presence of very reactive sulfate ($-OSO_3$) and hydroxyl ($-OH$) groups in its backbone makes κCg an effective adsorbent for removal of aqueous pollutants. Interestingly, due to sulfate moieties in its chemical structure, κCg shows a strong anionic character able to interact with materials with cationic characteristic (e.g., polymers such chitosan, sodium alginate), and this interaction favors the formation of a chemically stable ionic cross-linking, leading to pH-dependent hydrostability for the κCg hydrogel.

The present teachings are illustrated by the following examples.

EXAMPLES

Materials

The kappa carrageenan (food grade, Sigma Aldrich), zinc (II) chloride tetrahydrate ($ZnCl_2 \cdot 4H_2O$, reagent grade, Sigma Aldrich), and Methylene Blue, MB dye (Alfa Aesar) used in the Examples described herein were used as received, unless and otherwise specified. Deionized water (Milli-Q), with a resistivity of 18.2 MΩ·cm, was used throughout the experiments.

Example 1

Synthesis of Zn Cross-Linked κCg Hydrogel Nano Beads

Kappa-carrageenan, κCg (1 g) was dissolved in 100 mL of deionized water to form a 1% κCg solution. Then, zinc (II) chloride solution, which was prepared by dissolving zinc (II) chloride (1 g) in DI water (20 ml), was added to the κCg solution in a drop-wise manner at a temperature of 45±2° C. for 30 min, while stirring vigorously using a magnetic stirrer at 300-400 rpm. The nanobeads of Zn cross-linked κCg were formed immediately as the zinc chloride solution came into contact with the κCg solution. To complete crosslinking or harden beads, the formed hydrogel nanobeads were left in the solution with an immersion time of 5 hours, and a temperature of the reaction mixer was maintained at 45±2° C. The prepared beads were then washed with DI water to remove excess zinc chloride. The developed nanobeads were stored in wetted form using a plastic tube.

Example 2

Scanning Electron Microscopy (SEM)

Scanning electron microscopy (SEM, JEOL Ltd.) was used to observe surface and structural morphology of the beads. SEM analyses were performed in a wide beam current range to determine the nanostructure of the dry beads. For SEM analyses, beads were dried first overnight in a vacuum oven under nitrogen environment.

As shown in FIGS. 1A-1B, the hydrogel beads have nanometer scale sizes and an approximately spherical shape. An average diameter of the hydrogel beads is ≤100 nm, or about 20 nm to about 100 nm. The surface morphology of the beads changed completely once MB dye was adsorbed. The dye-adsorbed beads are shown in FIGS. 1C and 1D. A fragile outer layer was formed around the hard core after the dye was adsorbed. The size of beads increased marginally after dye adsorption.

Example 3

Adsorption Study

The biopolymer beads were added to 15 mL synthetic solutions of Methylene blue (MB) dye (600 ppm) and shaken (in a shaker bath) by a batch technique as a function of time for about 280 minutes at 25° C. Equilibrium time was determined from the saturation point of the adsorption kinetics data. Adsorption equilibrium isotherm was also studied as a function of the concentration of the dyes at 25° C. The initial concentrations ranged from 200 to 1000 ppm. The concentrations of dyes in solution after the adsorption experiment were determined with UV/VIS Spectrometer. An amount of the adsorbed dye was calculated using the following equation.

$$q = \frac{(C_o - C_f)V}{M} \quad (1)$$

where q is the amount adsorbed (mg·g$^{-1}$), $C_0$ and $C_f$ are the initial and final concentrations (mg·L$^{-1}$), respectively for dyes and metal ions, V is the solution volume (L) and M is the amount of adsorbent (g) used.

The adsorption equilibrium data MB dye was analyzed with the following nonlinear Langmuir adsorption equation (2):

$$q_e = \frac{q_{max} K_L C_e}{1 + K_L C_e} \quad (2)$$

where $q_e$ is the equilibrium quantity of the adsorbate adsorbed onto the adsorbent (mg·g$^{-1}$), $C_e$ is the equilibrium concentration (mg·L$^{-1}$), $q_{max}$ (mg·g$^{-1}$) and $K_L$ (L·mg$^{-1}$) are the Langmuir constants related to the saturation adsorption capacity and binding energy (affinity), respectively.

The data obtained from the equilibrium time study was further analyzed by using pseudo-second-order model equation (3):

$$\frac{t}{q_t} = \frac{1}{K_2 q_{2e}^2} + \frac{1}{q_{2e}} t \quad (3)$$

where $q_t$ and $q_{2e}$ are the grams of solute sorbed per gram of sorbent at any time and at equilibrium, respectively, and $K_2$ is the observed rate constant of the pseudo-second-order model. This was done to get further insight and understand the process of dye adsorption onto the biopolymer beads.

Figure 2A:
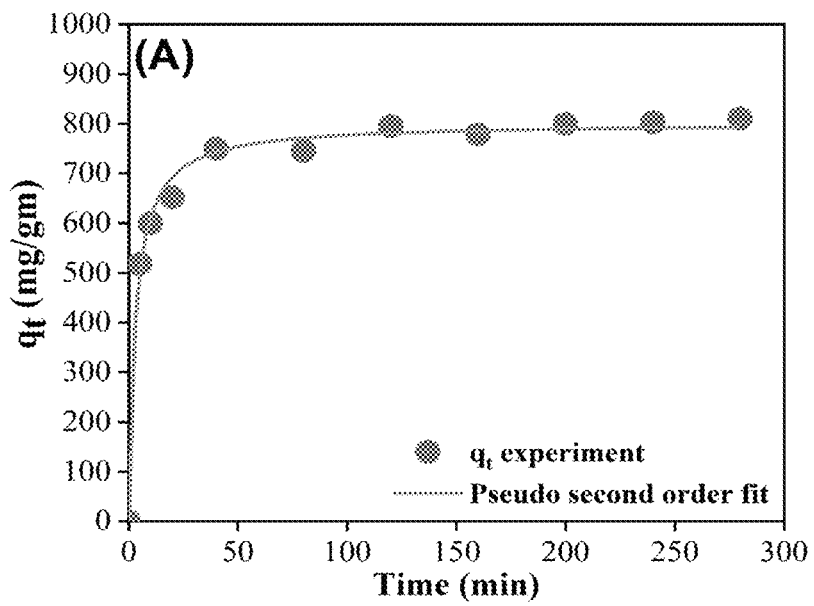
FIGS. 2A-2B are graphs showing methylene blue, MB, dye removal by the present wet nano beads from solutions with MB concentration (600) using (2A) nonlinear kinetic study of the adsorption; and (2B) nonlinear Langmuir isothermal adsorption.
Figure 2B:
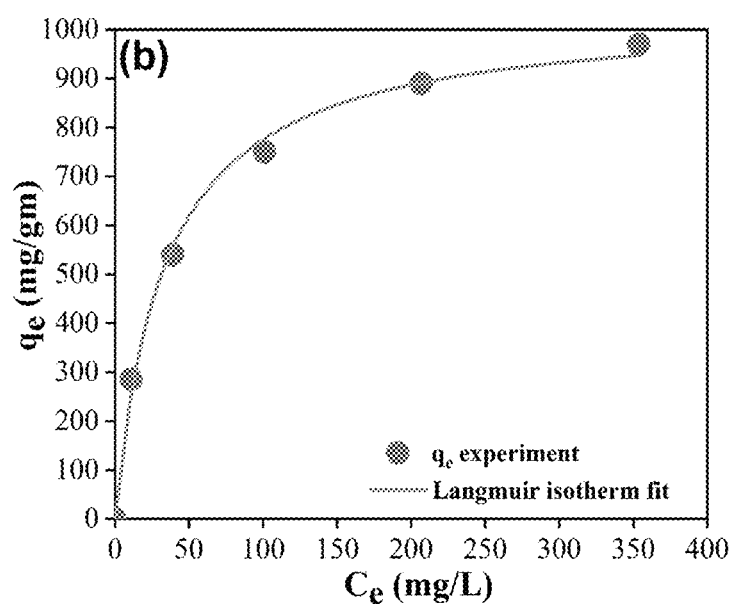

Adsorbents with a high adsorption rate are valuable because they require less time to complete the adsorption process. Therefore, studying the influence of time on the adsorption process is practically important for designing a treatment plant for contaminated water. FIG. 2A shows the contact time versus the adsorption capacity of the developed biopolymer nano-beads in relation to MB dye removal by wet nanobeads from solutions with a designated MB concentration, such as 600 ppm. The amount of adsorption for all the dyes was found to increase sharply until 40 min and levelled off at 180 min. The shape of the curve indicated that the binding of the dye to active sites on the biopolymer nano-beads adsorbent increased up to 150 min and was homogeneously saturated at 180 min. At this time, there is an equilibrium between adsorption and desorption of dye. To investigate the adsorption kinetics, the nonlinear pseudo-second-order model was used to analyze the data obtained from the equilibrium time study. The nonlinear optimization method was used to reduce the respective error.

FIG. 2A shows the fitting of the pseudo-second-order models, and Table 1 presents the kinetic parameters and the $R^2$ values obtained via the nonlinear fitting. The $R^2$ value is 0.99234, and the calculated equilibrium adsorption capacity value ($q_{e,cal}$) of the pseudo-second-order model were closer to the experimental results ($q_{e,exp}$), which are 799 and 801.7 mg/gm, respectively. FIG. 2A shows that the adsorption data are fitted to nonlinear Langmuir equation. Table 2 presents the parameters of the applied nonlinear Langmuir isotherm model for analyzing the adsorption process. The maximum adsorption capacity of MB dye onto the introduced adsorbents was 1070 mg/g.

TABLE 1

Parameters of pseudo-second-order models

|  | $q_{e,exp}$ | $q_{e,cal}$ | $K_2$ | $R^2$ |
| --- | --- | --- | --- | --- |
| MB | 799 | 801.7 | 0.00039 | 0.99234 |

TABLE 2

Parameters of nonlinear Langmuir isothermal adsorption

|  | $q_{max}$ (mg/gm) | $K_L$ | $R^2$ |
| --- | --- | --- | --- |
| MB | 1070 | 0.02955 | 0.9871 |

Example 4

Water Swelling Measurement

A hydrogel's water absorbency and resistance to dissolution depends on the hydrophilic group's functionality and degree of cross-linking present in the hydrogel structure. The water absorbency of the developed crosslinked κCg hydrogel was measured via gravimetric analysis. In the analysis, the as-prepared crosslinked κCg hydrogel with a fixed weight was immersed in deionized water at room temperature for different interval times (4, 8, 12, 16, 20 and 24 h). The swollen hydrogel sample was filtered using a mesh stainless screen to separate unabsorbed water. The water absorbency of hydrogel was calculated by using the following equation:

$$Q=(m_2-m_1)/m_1$$

where, $m^1(g)$ and $m^2(g)$ are the sample weights in the dry state and swollen state at a certain time, respectively.

Figure 3:
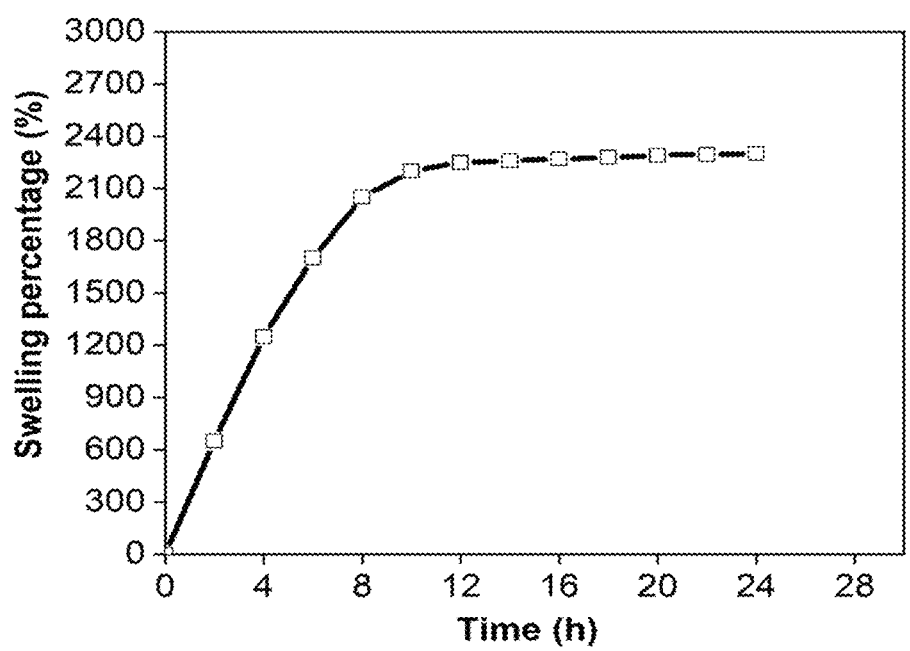
FIG. 3 is a graph showing swelling or water absorbency of the present ionically crosslinked kCg hydrogel nano beads.
Figures 4A, 4B:
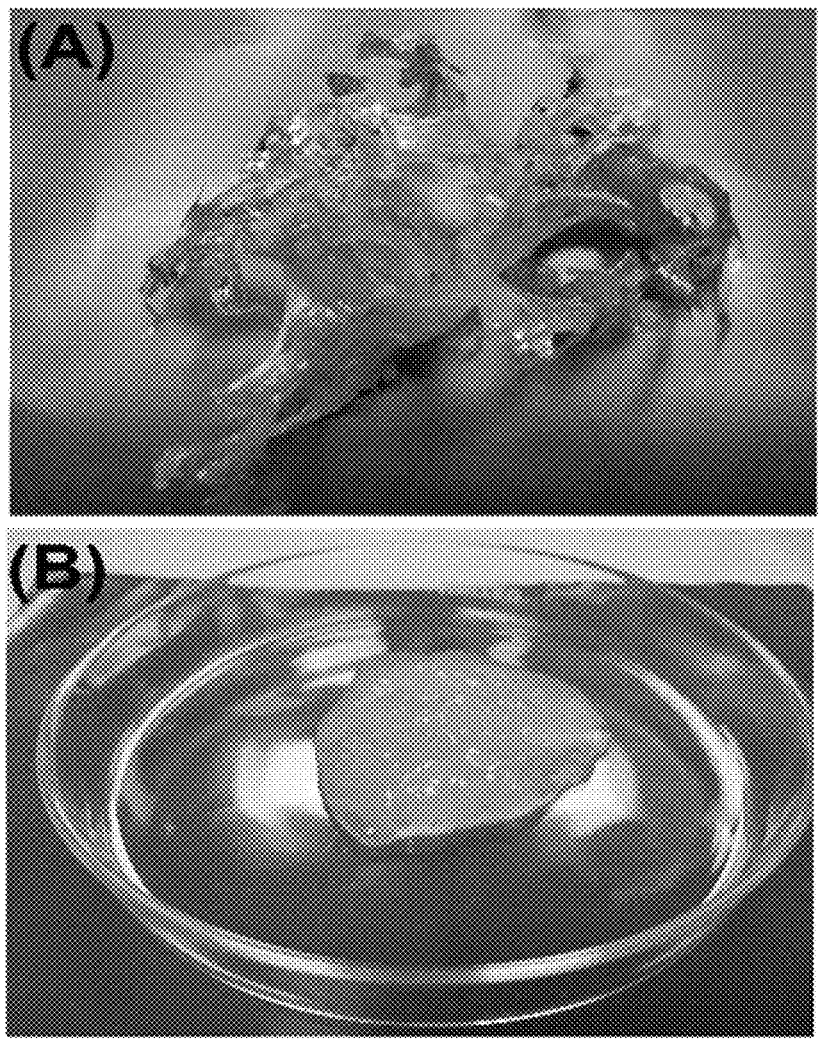
FIGS. 4A-4B show images of dry (FIG. 4A) and swollen (FIG. 4B) hydrogels made of Zn ions-crosslinked kCg hydrogel.

The crosslinked hydrogel nanobeads showed an excellent swelling degree, as observed from FIGS. 3, 4A, and 4B. Also, it was observed that the crosslinked hydrogel nanobeads reached the equilibrium swelling stage or degree in less than 10 h of immersion, and the crosslinked hydrogel was found stable in water. It is very clear from the obtained results that Zn ions crosslinked κCg exhibited hydrogel characteristics, i.e., Zn ion-crosslinked κCg hydrogel did not dissolve easily in water and became water resistant, demonstrating that the 3D network structures were more stable than the non-crosslinked kCg. The rigid structure of crosslinked kCg confirm the formation of crosslinking. Overall, the developed hydrogel nanobeads were able to greatly absorb and retain water in their 3D network structure. As seen in FIG. 3, the high water penetration capabilities of the present hydrogel nanobeads can have a swelling ratio of 2300 times.

It is to be understood that the hydrogel nanobeads are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A hydrogel nanobead, comprising an ionically crosslinked sulfated polysaccharide biopolymer and having a size ranging from about 20 nm to about 100 nm, wherein the ionically crosslinked sulfated polysaccharide biopolymer comprises carrageenan crosslinked with a metal ion crosslinking agent, the metal ion crosslinking agent comprising $Zn^{2+}$ and having a concentration selected from about 0.01 wt % to about 1.0 wt %.

2. The hydrogel nanobead of claim 1, wherein the carrageenan is kappa carrageenan.

3. A method of removing a pollutant from wastewater, comprising contacting the hydrogel nanobead of claim 1 with the wastewater.

4. The method of claim 3, wherein the pollutant is selected from the group consisting of dyes, metals, and combinations of distinct pollutants thereof.

5. The method of claim 4, wherein the pollutant comprises a cationic dye.

6. The method of claim 5, wherein the cationic dye is methylene blue (MB).

7. The method of claim 6, wherein a concentration of the methylene blue (MB) in the wastewater is 600 ppm.

* * * * *